US011663601B2

(12) United States Patent
Goodsitt et al.

(10) Patent No.: US 11,663,601 B2
(45) Date of Patent: May 30, 2023

(54) GENERATING ACCOUNT NUMBERS USING BIOMETRIC INFORMATION OBTAINED VIA A GENERIC TRANSACTION CARD

(71) Applicant: Capital One Services, LLC, McLean, VA (US)

(72) Inventors: Jeremy Goodsitt, Champaign, IL (US); Galen Rafferty, Mahomet, IL (US); Anh Truong, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/380,890

(22) Filed: Jul. 20, 2021

(65) Prior Publication Data

US 2023/0021430 A1  Jan. 26, 2023

(51) Int. Cl.
*G06Q 20/40* (2012.01)
*H04L 9/06* (2006.01)

(52) U.S. Cl.
CPC ... *G06Q 20/40145* (2013.01); *G06Q 20/4016* (2013.01); *H04L 9/0643* (2013.01)

(58) Field of Classification Search
None
See application file for complete search history.

(56) References Cited

U.S. PATENT DOCUMENTS

| | | | |
|---|---|---|---|
| 4,717,816 A * | 1/1988 | Raymond | G07C 9/27 235/382.5 |
| 5,280,527 A | 1/1994 | Gullman et al. | |
| 8,494,959 B2 | 7/2013 | Hathaway et al. | |
| 8,752,146 B1 | 6/2014 | van Dijk et al. | |
| 9,183,480 B1 * | 11/2015 | Quigley | G06K 19/07707 |
| 9,183,490 B2 * | 11/2015 | Moreton | G06K 19/0727 |
| 9,922,320 B2 | 3/2018 | Bonalle et al. | |
| 10,817,878 B2 * | 10/2020 | Rans | G06Q 20/341 |
| 10,891,619 B2 | 1/2021 | Zarakas et al. | |
| 2007/0073619 A1 * | 3/2007 | Smith | G07C 9/257 705/41 |
| 2008/0201265 A1 | 8/2008 | Hewton | |

(Continued)

FOREIGN PATENT DOCUMENTS

WO  2020032517 A1  2/2020

OTHER PUBLICATIONS

Oct. 4, 2022—(WO) International Search Report and Written Opinion—PCT/US2022/037132.

*Primary Examiner* — Bruce I Ebersman
*Assistant Examiner* — Matthew Cobb
(74) *Attorney, Agent, or Firm* — Banner & Witcoff, Ltd.

(57) ABSTRACT

Methods and systems disclosed herein describe a generic transaction card that generates an account number based on a biometric identifier of a user. Multiple users may use the generic transaction card to transact. For example, a first user may provide a first biometric identifier to the generic transaction card, which may generate a first account number associated with the first user. The first user may then use the generic transaction card to transact. Similarly, a second user may provide a second biometric identifier to the same generic transaction card, which may generate a second account number associated with the second user. The second user may then use the same generic transaction card to make purchases charged to the second user's account.

20 Claims, 5 Drawing Sheets

(56) References Cited

U.S. PATENT DOCUMENTS

2010/0332387 A1\* 12/2010 Tanner ................. G06Q 20/352
                                                        705/41
2017/0061430 A1   3/2017 Matthews et al.
2017/0061438 A1\* 3/2017 Patel .................. G06Q 20/4016
2018/0211249 A1\* 7/2018 Sims ................... G06Q 20/352
2019/0034911 A1\* 1/2019 Wilson ............ G06Q 20/40145

\* cited by examiner

400

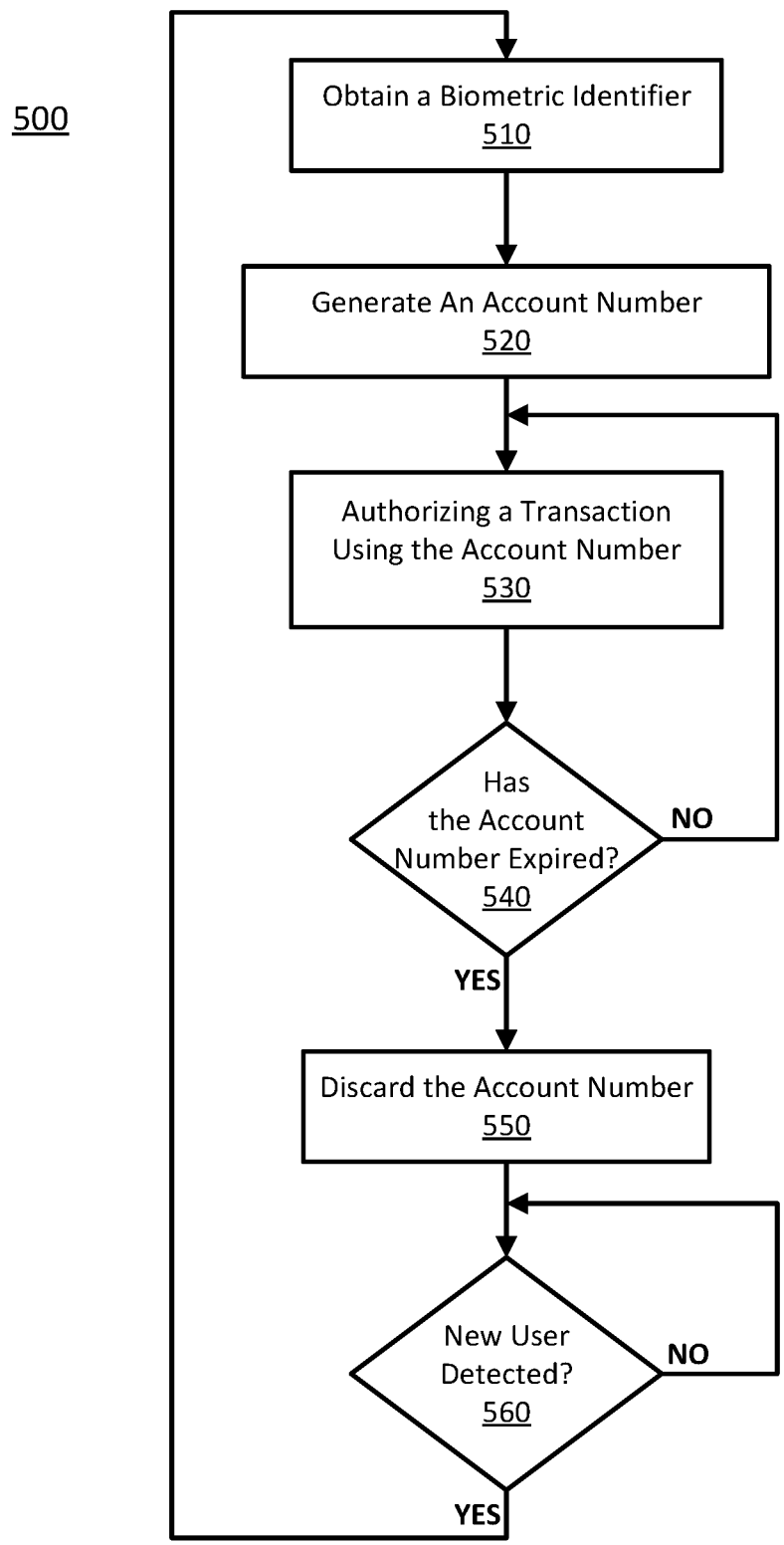

GENERATING ACCOUNT NUMBERS USING BIOMETRIC INFORMATION OBTAINED VIA A GENERIC TRANSACTION CARD

FIELD OF USE

Aspects of the disclosure relate generally to transaction cards and more specifically to generating an account number using biometric information.

BACKGROUND

Transaction cards, and the account numbers printed thereon, are prone to being stolen. Thieves can rack up a significant amount in charges before the cardholder and/or financial institution become aware that the card has fallen into the wrong hands.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The methods, devices, systems, and/or computer-readable media disclosed herein describe a generic transaction card that generates an account number based on a biometric identifier of a cardholder. The generic transaction card may not have an account number printed thereon. Moreover, the generic transaction card may not permanently store an account number thereon to prevent the transaction card from being swiped.

The generic transaction card may comprise a microprocessor, a smart chip, a short-range transceiver, a display, and/or a sensor. The generic transaction card may receive a biometric identifier, for example, from the sensor or from a device paired with the generic transaction card via the short-range wireless transceiver. The biometric identifier may be used to generate an account number, which the user can use to transact. The account number may be stored on the generic transaction card for a single transaction, a predetermined quantity of transactions, and/or a predetermined amount of time. In some examples, the generic transaction card may cause the account number to be outputted via the display. By using these techniques, a thief may be prevented from using the stolen generic transaction card.

Additionally, the above-described techniques allow multiple users to use the generic transaction card to transact. That is, two users, both with accounts from the same financial institutions, may use the same generic transaction card to transact from their respective accounts. For example, a first user may provide a first biometric identifier. The generic transaction card may generate a first account number associated with the first user. The first user may then use the generic transaction card to transact, with the purchases being deducted from, or charged to, an account associated with the first account number. Similarly, the second user may provide a second biometric identifier to the same generic transaction card. The generic transaction card may generate a second account number associated with the second user. The second user may then use the same generic transaction card to transact, with the purchases being deducted from, or charged to, an account associated with the second account number. In addition to the security benefits discussed above, the techniques described above also provide a convenience factor allowing multiple users to use a single card with the transactions being recorded against each of the multiple users' respective accounts.

These features, along with many others, are discussed in greater detail below.

DESCRIPTION OF THE DRAWINGS

The present disclosure is described by way of example and not limited in the accompanying figures in which like reference numerals indicate similar elements and in which:

FIG. 5 shows a flow chart of a process for using a generic transaction card to make purchases according to one or more aspects of the disclosure.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for a generic transaction card that generates an account number based on a biometric identifier provided by a user. The generic transaction card may comprise a microprocessor, a smart chip, a short-range transceiver, a display, and/or a sensor. The generic transaction card may receive a biometric identifier from the sensor or from a device paired with the generic transaction card via the short-range wireless transceiver, and generate an account number that the user can use to transact. The account number may be stored on the generic transaction card for a single transaction, a predetermined quantity of transactions, and/or a predetermined amount of time. In some examples, the generic transaction card may cause the account number to be outputted via the display. Additionally, the generic transaction card described herein may allow multiple users to use the generic transaction card to transact. That is, two users, both with accounts from the same financial institutions, may use the same generic transaction card to transact from their respective accounts. By using these techniques, a thief may be prevented from using the stolen generic transaction card. The generic transaction card may not have an account number printed thereon. Moreover, the generic transaction card may not permanently store an account number thereon to prevent the transaction card from being swiped. Additionally, the user of a generic transaction card provides a convenience factor by allowing multiple users to use a single card to record transactions against their own accounts.

Figure 1:
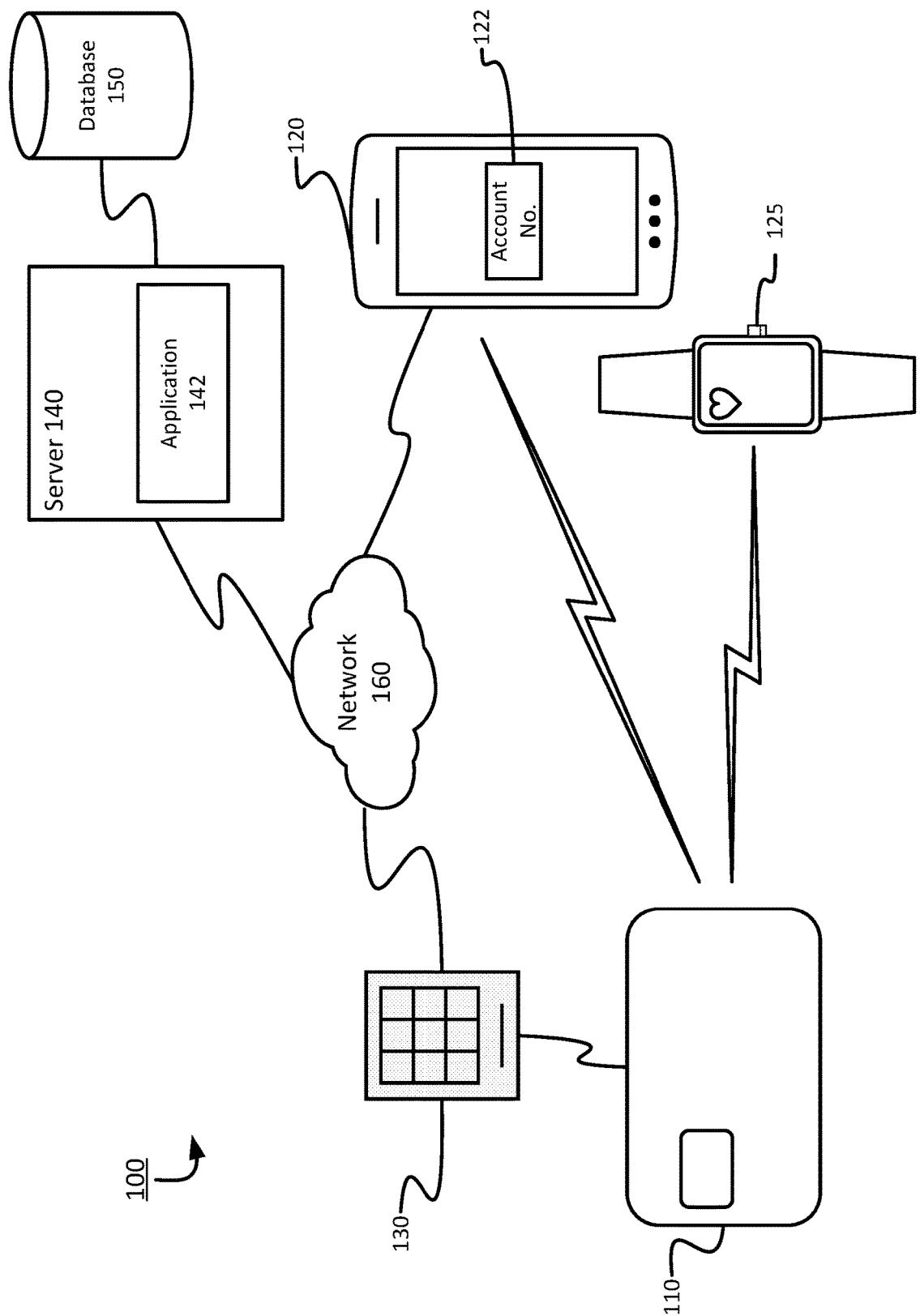
FIG. 1 shows an example of a system in which one or more aspects described herein may be implemented.

FIG. 1 shows a system 100 that illustrates several of the components that may be found when conducting a transaction with a generic transaction card. For example, system 100 shows generic transaction card 110 communicatively coupled to device 120, wearable device 125, and card reader 130. Additionally, system 100 shows device 120 and card reader 130 communicatively coupled to server 140, which may include database 150, via network 160.

Transaction card 110 may be any suitable card configured to permit a cardholder to access funds in one or more of a cardholder's account. In this regard, transaction card 110 may be a credit card, a charge card, a debit card, a prepaid card, a payment card, or the like. In some embodiments, transaction card 110 may provide access to one or more types of accounts. For instance, transaction card 110 may allow a cardholder to select from a credit card option and/or a debit card option. As will be discussed in greater detail with respect to FIG. 3, transaction card 110 may be a chip-enabled card. In some embodiments, transaction card 110 may include a magnetic strip, in addition to the chip. In further embodiments, transaction card 110 may include near field communication (NFC) capabilities, short-range wireless communication capabilities (e.g., Bluetooth®), wireless communication capabilities (e.g., Wi-Fi), or any combination thereof. The NFC capabilities, short-range wireless communication capabilities, wireless communication capabilities may be referred to collectively as communication capabilities. These communication capabilities may permit transaction card 110 to communicate with device 120, wearable device 125, and/or card reader 130.

Device 120 may be a mobile device, such as a cellular phone, a mobile phone, a smart phone, a tablet, a laptop, or the like. Alternatively, device 120 may be any suitable internet-enabled device, such as a smart speaker, smart television, or the like. Device 120 may be configured to provide a first cardholder with access to various applications and services. For example, device 120 may provide the first cardholder with access to the Internet. Additionally, device 120 may provide the first cardholder with one or more applications located thereon. The one or more applications may provide the first cardholder with a plurality of tools and access to a variety of services. In some embodiments, the one or more applications may include an application, such as a banking application or credit card application, that allows the first cardholder to set up spending alerts and notifications. The alerts and notifications may include push notifications, such as notification 122. As will be discussed in greater detail below, the notification 122 may be an account number. The device 120 may comprise one or more sensors configured to obtain a biometric identifier of a cardholder and transmit the biometric identifier to the transaction card 110. The one or more sensors may comprise a camera, a fingerprint scanner, a microphone, an accelerometer, etc. The camera may be used to capture the cardholder's face, hair color, skin tone, facial features, visual appearance—such as body and/or body shape, or breathing patterns (e.g., via a video recording of the user) as the biometric identifier. Similarly, the fingerprint scanner may be used to obtain an image of the cardholder's fingerprint. The microphone and/or accelerometer may be used to capture the users' breathing pattern, a voiceprint, etc.

Wearable device 125 may be a device worn and/or attached to a cardholder. In this regard, wearable device may be a smart watch, a fitness tracker, augmented reality glasses, etc. Additionally or alternatively, wearable device 125 may be a subcutaneous implant, such as a glucose monitor/sensor, or other implantable device. The wearable device 125 may also be configured to obtain a biometric identifier of the user and transmit the biometric identifier to the transaction card 110 to generate an account number. In this regard, the wearable device 125 may obtain the user's resting pulse rate, blood oxygen level, blood pressure, blood sample, DNA sample, glucose reading, body fat percentage, etc. as the biometric identifier.

Card reader 130 may be any suitable card reader capable of reading data and/or information from transaction card 110. In this regard, card reader 130 may be a chip-based reader, a magnetic-based reader, an EMV reader, or any combination thereof. Accordingly, card reader 130 may include a display, a keypad, and a network interface. The display may present information to the cardholder, such as the amount owed, the status of the transaction, and whether the transaction has been approved or denied. Keypad may allow a cardholder to input a PIN code, password, an amount for withdrawal, and the like. Network interface may be a wired connection, wireless connection, a short-range wireless connection, an NFC connection, or any combination thereof. Network interface may permit card reader 130 to communicate with server 140, via network 160, for example, to authorize a transaction. Similarly, network interface may permit card reader 130 to communicate with transaction card 110, device 120, and/or wearable device 125. In these instances, card reader 130 may convey information related to the cardholder's account to transaction card 110, the device 120, and/or the wearable device 125.

Server 140 may be any server capable of executing application 142. Additionally, server 140 may be communicatively coupled to database 150. In this regard, first server 140 may be a stand-alone server, a corporate server, or a server located in a server farm or cloud-computer environment. According to some examples, first server 140 may be a virtual server hosted on hardware capable of supporting a plurality of virtual servers.

Application 142 may be server-based software configured to provide cardholders with access to their account information and perform routing banking functions. In some embodiments, application 142 may be the server-based software that corresponds to the client-based software executing on device 120. Additionally, or alternatively, application 142 may provide cardholders access to their account information through a website accessed by device 120 via network 160.

Database 150 may be configured to store information on behalf of application 142. The information may include, but is not limited to, personal information, account information, and cardholder-preferences. Personal information may include a cardholder's name, address, phone number (i.e., mobile number, home number, business number, etc.), social security number, cardholder name, password, employment information, family information, the biometric identifier, and any other information that may be used to identify the first cardholder. Account information may include account numbers, account balances, bill pay information, direct deposit information, wire transfer information, statements, and the like. Database 150 may include, but is not limited to, relational databases, hierarchical databases, distributed databases, in-memory databases, flat file databases, XML databases, NoSQL databases, graph databases, and/or a combination thereof.

Network 160 may include any type of network. In this regard, first network 160 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and cardholders to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
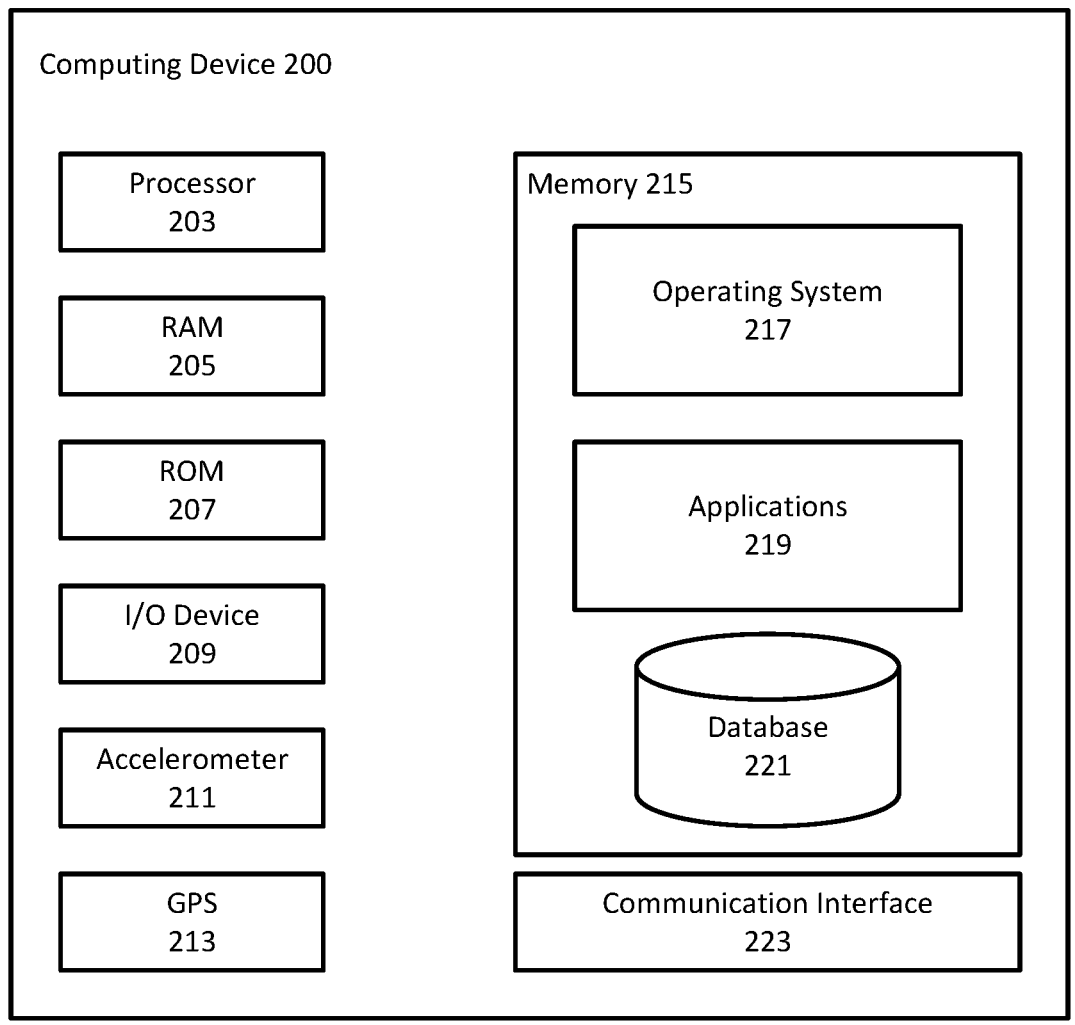
FIG. 2 shows an example of a computing device in accordance with one or more aspects of the disclosure.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, electronic terminals, transactional terminals, and the like, and/or any other type of data processing device.

Input/output (I/O) device 209 may include a microphone, keypad, touch screen, and/or stylus through which a cardholder of the computing device 200 may provide input, and may also include one or more of a speaker for providing audio output and a video display device for providing textual, audiovisual, and/or graphical output. In some embodiments, I/O device 209 may include an image capture device.

Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation of computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first cardholder.

Communication interface 223 may include one or more transceivers, digital signal processors, and/or additional circuitry and software for communicating via any network, wired or wireless, using any protocol as described herein. Communication interface 223 may also include near field communication (NFC) capabilities, short-range wireless communication capabilities (e.g., Bluetooth®), wireless communication capabilities (e.g., Wi-Fi), or any combination thereof.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein.

Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
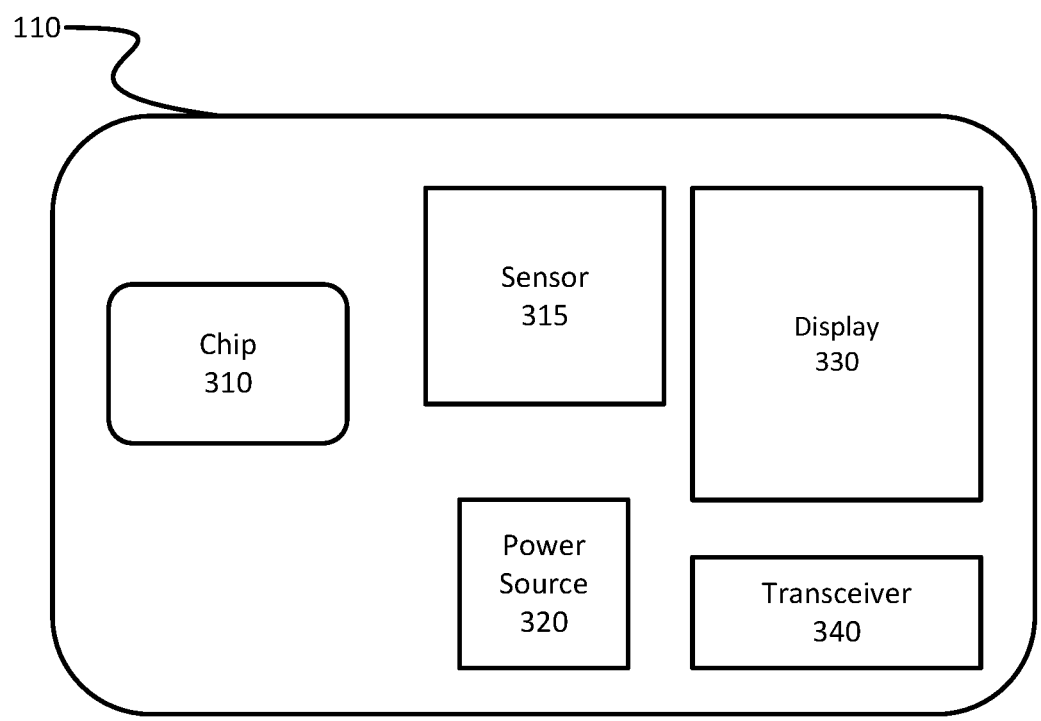
FIG. 3 shows an example of a generic transaction card in accordance with one or more aspects of the disclosure.

Turning to FIG. 3, transaction card 110 is shown. Transaction card 110 may be of a standard size and made of a suitable substrate, such as plastic, metal, etc. Transaction card 110 may include chip 310, a sensor 315, a power source 320, a display 330, and/or a transceiver 340.

Chip 310 may be a smart chip or integrated circuit. In this regard, chip 310 may include a microprocessor and memory, such as read only memory (ROM) and random access memory (RAM). Additionally, chip 310 may include one or more contact pads to receive voltage to power the transaction card and exchange signals with a terminal, such as the device 120, the wearable device 125, and/or the card reader 130. In some instances, the chip 310 may be configured to execute one or more applications. The applications may allow chip 310 to process payments, for example, using a payment application. In other examples, the applications may allow the chip 310 to perform cryptographic processing, authenticate transaction card 110, define risk management parameters (e.g., when the transaction may be conducted offline), digitally sign payment data, and verify the cardholder. In further examples, the chip 310 may be configured to generate an account number based on a biometric identifier. The biometric identifier may be obtained by the transaction card 110, for example, via the sensor 315. Additionally or alternatively, the biometric identifier may be received from a device, such as the device 120 and/or the wearable device 125. The chip 310 may display the account number, for example, via the display 330. In some embodiments, chip 310 may be a dual interface chip that provides for contact and contact-less interfaces.

Sensor 315 may be configured to obtain a biometric identifier from a user of the transaction card 110. The sensor 315 may comprise an input device configured to receive a biometric input (e.g., fingerprint, facial recognition, eye scan, voice recognition, and/or the like). The sensor 315 may comprise any suitable input device, including, for example, an image capture device (e.g., camera), a microphone, etc. Additionally or alternatively, the sensor 315 may be configured to receive bodily fluid as the biometric input. The bodily fluid may comprise a blood sample, a spit sample, etc. The sensor 315 may pass the biometric input to a processor, such as the chip 310, to generate one or more account numbers associated with the user.

Power source 320 may comprise any suitable energy storage component capable of providing power to one or more components of the transaction card 110. In this regard, the power source 320 may comprise a lithium polymer battery, a lithium-metal battery, lithium-ceramic battery, and/or any other type of battery. In some instances, transaction card 110 may include a charging port (not shown) to receive a cable to supply power to recharge power source 320. In other examples, the power source 320 may comprise an inductive coil to recharge the power supply 320 via electromagnetic induction. In still further embodiments, power source 320 may include one or more solar cells configured to provide power to transaction card 110. The power source 320 may be constructed from any suitable material, including rigid materials, semiflexible materials, and/or flexible materials.

Display 330 may be any suitable display capable of presenting information associated with the transaction card 110. The information may comprise transactional information, such as an account number (e.g., credit/debit card number), a card verification value (CVV), an expiration date, a signature, a photo, an account balance, a spending limit, or the like. Alternatively, the information may comprise personal information, including, for example, a photo, a full legal name, an identification number (e.g., a driver's license number, a social security number, etc.), a personal address, a date-of-birth, etc. The display 330 may comprise a liquid crystal display (LCD) display technology, a light emitting diode (LED) display technology, ePaper technology (e.g., e-ink), vacuum fluorescent display technology, and/or the like.

Transceiver 340 may be configured to exchange signals with a terminal. In some embodiments, the transceiver 340 may include an antenna or other communication capabilities, such as NFC, Wi-Fi, Bluetooth®, and/or Bluetooth Low Energy (BLE). The transceiver 330 may be configured to permit transaction card 110 to communicate with the device 120, the wearable device 125, and/or the card reader 130. In other examples, the transceiver 340 may comprise a short-range wireless transceiver configured to exchange signals with the device 120, the wearable device 125, and/or the card reader 130 and/or device 120. In some examples, the transaction card 110 may receive a biometric identifier from a paired device (e.g., the device 120, the wearable device 125) via the transceiver 340.

Figure 4:
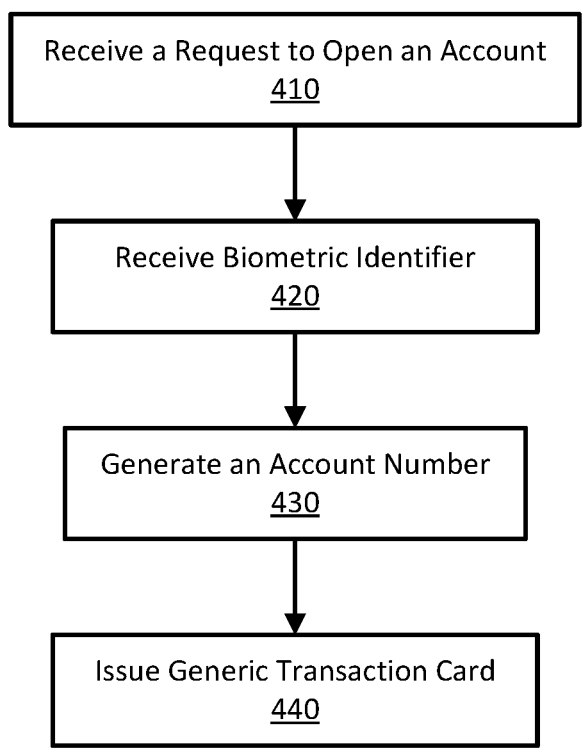
FIG. 4 shows a flow chart of a process for opening an account according to one or more aspects of the disclosure.

In order to obtain a generic transaction card, a user may first open an account with a financial institution. FIG. 4 shows a flow chart of a process 400 for opening an account according to one or more aspects of the disclosure. Some or all of the steps of process 400 may be performed using a computing device, such as device 120 or server 140.

In step 410, a computing device, such as device 120 or server 140, may receive a request to open an account. The request to open the account may be received via a webpage, or an equivalent web interface. Additionally or alternatively, the request to open the account may be received, for example, via a mobile application located on a user device. In some examples, the request to open the account may be received at an automated teller machine (ATM). The request may comprise user information. The user information may comprise personal information, such as the user's name, address, social security history, education, etc. Additionally or alternatively, the user information may comprise employment information. The employment information may comprise an employer's name, address, how long the user has been employed, the user's title, the user's earnings, etc. Additionally or alternatively, the user information may comprise login credentials. That is, the user may be asked to establish login credentials as part of opening a new account. The login credentials may comprise a username and password, a token (e.g., the wearable device 125), multifactor credentials, one or more biometric identifiers, and the like. As part of the account number generation, the computing device may request a biometric identifier from the user.

In step 420, the computing device may receive the biometric identifier. Like the request to open the account, the biometric identifier may be received via a webpage, or an equivalent web interface. In this regard, the user may provide the biometric identifier to one of more input devices (e.g., camera, microphone, fingerprint scanner, etc.). After the one or more input devices have obtained the biometric identifier, the user's device may send (e.g., upload) the biometric identifier to the computing device. Additionally or alternatively, the biometric identifier may be received via a mobile application on the user device. In this regard, the mobile application may activate one or more input devices of the user device to obtain one or more biometric identifiers associated with the user. The mobile application may send (e.g., upload) the one or more biometric identifiers to the computing device. In another example, the one or more biometric identifiers may be obtained from a wearable device (e.g., the wearable device 125). The wearable device may send the one or more biometric identifiers to a paired device, such as the device 120 or another computing device associated with the user. The paired device may then send (e.g., upload) the one or more biometric identifiers to the computing device.

The one or more biometric identifiers may comprise a fingerprint, a voice sample, an image of the first user's face, a blood sample, a breathing rate, a resting pulse rate, a blood oxygenation level, a blood pressure reading, a DNA sample, a glucose reading, body fat percentage, or the like. Additionally or alternatively, the tone or more biometric identifiers may comprise hair color, skin one, facial features, body, height, weight, body shape, etc. In yet another example, the one or more biometric identifiers may comprise a body mass index (BMI) estimation based on measurements (e.g., an estimation) of the user's height and/or weight. The one or more biometric identifiers may comprise a body fat percentage, for example, determined by passing an electrical signal through the user's body. A plurality of samples of the one or more biometric identifiers may be obtained. The plurality of samples may be used to generate a normalized biometric identifier. That is, the computing device may use the plurality of samples to generate a normalized biometric identifier. The normalized biometric identifier may be used as a baseline and/or comparison point for subsequently received biometric identifiers. Additionally or alternatively, the normalized biometric identifier may be used to generate an account number for a transaction card to be issued to the user.

In step 430, the computing device may generate an account number based on the one or more biometric identifiers. Generating the account number may comprise performing a one-way function on the one or more biometric identifiers. In some instances, a plurality of biometric identifiers may be concatenated before the one-way function is applied to the concatenation of biometric identifiers. The one-way function may be a hash function, such as SHA-1, SHA-224, SHA-256, SHA-384, SHA-512, SHA-512/224, SHA-512/256, SHA3-224, SHA3-256, SHA3-384, SHA3-512, SHAKE128, SHAKE256, etc. In addition to the one or more biometric identifiers, the one-way function may receive one or more seed values as an input. The one or more seed values may provide additional entropy and/or randomization to the account number. The one or more seed values may be provided by a server, such as server 140. In some examples, the one or more seed values may comprise user information. After being generated, the account number may be stored in a memory, such as the database 150. That is, the account number may be stored with the user's information to verify purchases and/or credit refunds.

In step 440, the computing device may issue a generic transaction card to the user. As noted above, the generic transaction card may not have an account number and/or name printed thereon. Instead, the generic transaction card may comprise instructions that allow the generic transaction card to generate the account number, for example, in response to receiving one or more biometric identifiers from a user. For example, the generic transaction card may have the one-way function and/or the one or more seed values. Additionally, the generic transaction card may have a biometric reader, or an equivalent input device and/or sensor, to obtain one or more biometric identifiers from a user. Additionally or alternatively, the generic transaction card may have a transceiver to receive the one or more biometric identifiers from a device, such as the device 120 and/or the wearable device 125. Upon receiving the one or more biometric identifiers, the generic transaction card may generate the account number to allow the user to perform one or more transactions.

While the description of FIG. 4 describes the issuance of a new generic transaction card in response to opening a new account, it will be appreciated that several of the steps described above may be performed to create a new generic transaction card for a user, for example, in response to the prior generic transaction card expiring or in response to the prior generic transaction card being lost.

Once a user has a generic transaction card, different users may use the card to conduct transactions. FIG. 5 shows a flow chart of a process 500 for using a generic transaction card to make purchases according to one or more aspects of the disclosure. Some or all of the steps of process 500 may be performed using any of the devices described herein, including, for example, the transaction card 110, the device 120, and/or the wearable device 125.

In step 510, a generic transaction card, such as transaction card 110, may obtain one or more biometric identifiers from a user. The one or more biometric identifiers may be obtained using a biometric reader, or other suitable input device, located on the generic transaction card. Additionally or alternatively, the one or more biometric identifiers may be received from a device, such as device 120 and/or wearable device 125, via transceiver. The transceiver may be a short-range wireless transceiver. The short-range wireless transceiver may communicate using a suitable wireless protocol, such as NFC, Wi-Fi, Bluetooth, and/or BLE. Additionally or alternatively, the one or more biometric identifiers may be received from a point-of-sale terminal. In this regard, the point-of-sale terminal may pass the one or more biometric identifiers to the generic transaction card when the generic transaction card is inserted in the point-of-sale terminal. Additionally or alternatively, the point-of-sale terminal may send the one or more biometric identifiers to the generic transaction card via the transceiver. As noted above, the one or more biometric identifiers may comprise a fingerprint, a voice sample, an image of the first user's face (e.g., hair color, skin tone, facial features, etc.), a blood sample, a breathing rate, a resting pulse rate, a blood oxygenation level, a blood pressure reading, a DNA sample, a glucose reading, a body fat percentage, or the like.

After receiving the one or more biometric identifiers, the generic transaction card may generate the account number, in step 520. Generating the account number may be based on the one or more biometric identifiers. The generic transaction card may use a one-way function, such as a hash function (e.g., SHA-1, SHA-224, SHA-256, SHA-384, SHA-512, SHA-512/224, SHA-512/256, SHA3-224, SHA3-256, SHA3-384, SHA3-512, SHAKE128, SHAKE256, etc.). Like the computing device described above, the account number may be generated by concatenating a plurality of biometric identifiers before the one-way function is applied. Additionally or alternatively, a seed value may be input to the one-way function along with the one or more biometric identifiers. The seed value may be stored on the generic transaction card at the time the generic transaction card is issued. Additionally or alternatively, the generic transaction card may request the seed value from a server. The request may be transmitted to the server via a point-of-sale terminal, a user's mobile device, or any other suitable computing device. The generic transaction card may receive the seed value, for example, in response to the request transmitted to the server. Once the account number is generated, the user may use the generic transaction card to conduct one or more transactions. In some examples, the generic transaction card may comprise a display that causes the account number to be displayed, for example, to allow the user to make online purchases. Alternatively, the generic transaction card may store the account number and allow for transactions to be conducted using the card (e.g., via swiping or short-range communications).

When the generic transaction card is presented for a transaction, the transaction may be authorized, in step 530. In some examples, the generic transaction card may comprise one or more applications (e.g., applets) that allow the generic transaction card to authorize payment, authenticate the generic transaction card, define risk management parameters (e.g., when the transaction may be conducted offline), digitally sign payment data, and/or verify the cardholder (e.g., via a PIN or other code). In other examples, the generic transaction card may send the account number to a server, for example, via a point-of-sale terminal or a computing device (e.g., the device 120). The generic transaction card may then receive a response indicating approval or denial of that transaction. If the transaction is approved, the user's account may be charged the amount for the transaction.

In step 540, the generic transaction card may determine whether the account number has expired. The account number may expire based on one or more validity factors. The validity factors may define a predetermined amount of time for which the generic transaction card is to store the account number; a predetermined number of transactions for which the generic transaction card is to store the account number, and/or a predetermined merchant for which the generic transaction card is to store the account number. Additionally or alternatively, the one or more validity factors may comprise detecting a new user trying to use the card. That is, a second user, different from a first user, may be trying to use the card. If these conditions have not occurred, the generic transaction card may allow for more transactions to be processed by returning to step 530. However, if one or more of the above-defined conditions have occurred, the generic transaction card may discard the account number in step 550. That is, the generic transaction card may erase the account number from one or more memory locations. After the account number has been discarded, the generic transaction card may not be used to conduct anymore transactions.

In step 560, the generic transaction card may determine if a new user has been detected. If a new user has not been detected, the generic transaction card may loop through the decision-making step of 560 until a new user is detected. If a new user has been detected, the process may return to step 510 with the generic transaction card obtaining one or more biometric identifiers from the new user. In this regard, the generic transaction card may generate a new account number associated with the new user. Accordingly, multiple users may use the generic transaction card to transact with each user charging purchases to their respective accounts. Additionally or alternatively, the new user may be the same as the previous user requesting a new account number. In this case, the process may return to step 510. As noted above, an account number may expire after a predetermined amount of time or after a predetermined number of transactions. By returning to step 510, the same user may use the generic transaction card to generate a new account number after the previous account number has expired. This provides an additional level of security in the event that the previous account number was obtained by a malicious user.

The techniques described above improve the security of transaction cards. In this regard, the account number may not be stored on the card without the user. Thus, a thief may have a limited window, if any window at all, to make fraudulent purchases. Moreover, a generic transaction card that generates a per-user account number provides a convenience factor by allowing multiple users to use a single card to record transactions against their own accounts.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for preventing fraudulent transactions from being made with a physical transaction card, by authorizing the physical transaction card to conduct a transaction based on biometric information of a user, the method comprising:
    obtaining, by the physical transaction card, a first biometric identifier from a first user, the obtaining comprising receiving, via an input of the physical transaction card or by the physical transaction card from a computing device, the first biometric identifier;
    generating, by performing a one-way cryptographic function on the first biometric identifier, a first account number associated with the first user;
    storing the first account number in memory of the physical transaction card;
    authorizing, based on the first account number being stored in the memory of the physical transaction card, a first transaction to be conducted at a point-of sale location or online;
    erasing by the physical transaction card, based on a predetermined number of transactions having been authorized based on the first account number, the first account number from the memory of the physical transaction card;
    preventing, based on the first account number no longer being stored in the memory of the physical transaction card, transactions using the first account number;
    after the first account number has been erased from the memory, obtaining, by the physical transaction card, a second biometric identifier from a second user;
    generating, by performing a one-way cryptographic function on the second biometric identifier, a second account number associated with the second user, wherein the second account number is different from the first account number;
    storing the second account number in the memory of the physical transaction card; and
    authorizing, based on the second account number being stored in the memory of the physical transaction card, a second transaction to be conducted at a point-of-sale location or online,
    wherein the authorizing comprises receiving an indication that the second transaction is authorized, and
    wherein each of the first biometric identifier and the second biometric identifier comprises at least one of:
        a fingerprint;
        a voice sample;
        an image of the first user's face;
        an eye scan;
        hair color;
        skin tone;
        facial features;
        a visual appearance;
        a body shape;
        a body height;
        a body weight;
        a body mass index estimation;
        a blood sample;
        a breathing pattern;
        a breathing rate;
        a pulse rate;
        a DNA sample;
        a glucose reading;
        a blood oxygenation level;
        a blood pressure reading; or
        a body fat percentage.

2. The method of claim 1, wherein the obtaining the first biometric identifier comprises:
    receiving, via the input of the physical transaction card, the first biometric identifier.

3. The method of claim 1, wherein the obtaining the first biometric identifier comprises:
    receiving, by the physical transaction card from the computing device, the first biometric identifier, the computing device associated with the first user.

4. The method of claim 3, wherein the first biometric identifier is received via a short-range wireless transceiver of the physical transaction card.

5. The method of claim 1, wherein the obtaining the first biometric identifier comprises:
    receiving, by the physical transaction card from a point-of-sale terminal, the first biometric identifier.

6. The method of claim 1, wherein the one-way cryptographic function comprises a hash function.

7. The method of claim 1, wherein the authorizing the first transaction further comprises:
    sending, to a server, the first account number via a point-of-sale terminal; and
    receiving, from the server, a response indicating that the first transaction is authorized.

8. The method of claim 1, wherein the authorizing the second transaction further comprises:
    sending, to a server, the second account number; and
    receiving, from the server, a response comprising the indication that the second transaction is authorized.

9. The method of claim 1, wherein the predetermined number of transactions is one.

10. A physical transaction card configured to prevent fraudulent transactions by authorizing a transaction based on biometric information of a user, the physical transaction card comprising:
    one or more processors;
    an input device; and
    memory storing instructions that, when executed by the one or more processors, cause the physical transaction card to:
        receive, via the input device, a first biometric identifier from a first user;
        generate, by performing a hash function on the first biometric identifier, a first account number associated with the first user;
        store the first account number in the memory;
        authorize, based on the first account number being stored in the memory, a first transaction to be conducted at a point-of-sale location or online;
        erase, based on a predetermined number of transactions having been authorized based on the first account number, the first account number from the memory;
        prevent, based on the first account number no longer being stored in the memory, transactions using the first account number;

after the first account number has been erased from the memory, receive, via the input device, a second biometric identifier from a second user;
generate, by performing a hash function on the second biometric identifier, a second account number associated with the second user, wherein the second account number is different from the first account number;
store the second account number in the memory; and
authorize, based on the second account number being stored in the memory, a second transaction to be conducted at a point-of-sale location or online,
wherein authorize the second transaction comprises receiving an indication that the second transaction is authorized, and
wherein each of the first biometric identifier and the second biometric identifier comprises at least one of:
a fingerprint;
a voice sample;
an image of the first user's face;
an eye scan;
hair color;
skin tone;
facial features;
a visual appearance;
a body shape;
a body height;
a body weight;
a body mass index estimation;
a blood sample;
a breathing pattern;
a breathing rate;
a pulse rate;
a DNA sample;
a glucose reading;
a blood oxygenation level;
a blood pressure reading; or
a body fat percentage.

11. The transaction card of claim 10, wherein the predetermined number of transactions is one.

12. The transaction card of claim 10, wherein the input device comprises a biometric reader.

13. The transaction card of claim 10, wherein the input device comprises a short-range, wireless transceiver.

14. The transaction card of claim 10, further comprising: a display to render a visual representation of the first account number.

15. The transaction card of claim 14, wherein the instructions, when executed by the one or more processors, further cause the transaction card to render a visual representation of the first account number on the display in response to a request from the first user.

16. A non-transitory computer-readable medium storing instructions that, when executed by one or more processors, cause the one or more processors to perform a method for preventing fraudulent transactions from being made with a physical transaction card, by authorizing the physical transaction card to conduct a transaction based on biometric information of a user, the method comprising:
obtaining, by the physical transaction card, a first biometric identifier from a first user, the obtaining comprising receiving, via an input of the physical transaction card or by the physical transaction card from a computing device, the first biometric identifier;
generating, by performing a hash function on the first biometric identifier, a first account number associated with the first user;
storing the first account number in memory of the physical transaction card;
authorizing, based on the first account number being stored in the memory of the physical transaction card, a first transaction to be conducted at a point-of sale location or online;
determining that the first account number has expired based on a predetermined number of transactions having been authorized based on the first account number;
preventing, based on the first account number no longer being stored in the memory of the physical transaction card, transactions using the first account number;
after the first account number has been erased from the memory, obtaining, by the physical transaction card, a second biometric identifier from a second user, wherein the second user is different than the first user;
generating by performing a hash function, based on the second biometric identifier, a second account number associated with the second user, wherein the second account number is different from the first account number;
storing the second account number in the memory of the physical transaction card; and
authorizing, based on the second account number being stored in the memory of the physical transaction card, a second transaction to be conducted at a point-of-sale location or online,
wherein the authorizing comprises receiving an indication that the second transaction is authorized, and
wherein each of the first biometric identifier and the second biometric identifier comprises at least one of:
a fingerprint;
a voice sample;
an image of the first user's face;
an eye scan;
hair color;
skin tone;
facial features;
a visual appearance;
a body shape;
a body height;
a body weight;
a body mass index estimation;
a blood sample;
a breathing pattern;
a breathing rate;
a pulse rate;
a DNA sample;
a glucose reading;
a blood oxygenation level;
a blood pressure reading; or
a body fat percentage.

17. The non-transitory computer-readable medium of claim 16, wherein the instructions, when executed by the one or more processors, cause the one or more processors to perform steps comprising:
generating a third account number for the first user based on the first biometric identifier and a seed value; and
sending the third account number to a server.

18. The non-transitory computer-readable medium of claim 17, wherein the seed value is received from the server.

19. The non-transitory computer-readable medium of claim 16, wherein the instructions, when executed by the one or more processors, cause the one or more processors to perform steps comprising:
displaying the first account number in response to receiving a request from the first user.

20. The non-transitory computer-readable medium of claim 16, wherein the predetermined number of transactions is one.

\* \* \* \* \*